US008272046B2

(12) United States Patent
Gundavelli et al.

(10) Patent No.: US 8,272,046 B2
(45) Date of Patent: Sep. 18, 2012

(54) NETWORK MOBILITY OVER A MULTI-PATH VIRTUAL PRIVATE NETWORK

(75) Inventors: Srinath Gundavelli, San Jose, CA (US); Paulina Dung Tran, Milpitas, CA (US); Kent Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1344 days.

(21) Appl. No.: 11/939,429

(22) Filed: Nov. 13, 2007

(65) Prior Publication Data

US 2009/0122990 A1   May 14, 2009

(51) Int. Cl.
*G06F 7/04* (2006.01)
(52) U.S. Cl. .................. 726/15; 726/14; 726/4
(58) Field of Classification Search .......... 726/4
See application file for complete search history.

(56) References Cited

U.S. PATENT DOCUMENTS

| 7,366,188 | B2* | 4/2008 | Kim .............................. 370/401 |
| 2012/0030478 | A1* | 2/2012 | Dunmire et al. ............. 713/189 |
| 2012/0030774 | A1* | 2/2012 | Keith et al. .................... 726/30 |
| 2012/0096529 | A1* | 4/2012 | Bournelle et al. ................ 726/7 |

OTHER PUBLICATIONS http://tools.ietf.org/id/draft-gundavelli-mip4-multiple-tunnel-support-03.txt;.Jul. 12, 2010.*
Kevank, posting in year 2006, DD-WRT Forum :: View topic—Does OpenVPN support multiple tunnels?); Tue Jun. 13, 2006 12:24 am.*
Kozierok (The TCP/IP Guide, Sep. 20, 2005; year 2005.*

* cited by examiner

*Primary Examiner* — David Y Jung
(74) *Attorney, Agent, or Firm* — P. Su

(57) ABSTRACT

Methods and apparatus for applying a single virtual private network (VPN) address to tunnels or connections associated with different access interfaces are disclosed. In one embodiment, a method includes establishing a first tunnel between a node and a VPN server. The first tunnel has a first address. The method also includes assigning a VPN address to the first tunnel, as well as establishing a second tunnel between the node and the VPN server. The second tunnel has a second address. The VPN address is assigned to the second tunnel, and VPN address is accessed by both the first address and the second address.

26 Claims, 4 Drawing Sheets

NETWORK MOBILITY OVER A MULTI-PATH VIRTUAL PRIVATE NETWORK

BACKGROUND OF THE INVENTION

The present invention relates generally to mobile networks.

Mobile devices have the capability to connect to networks, e.g., the Internet, using multiple access interfaces or technologies and to maintain sessions over links associated with the multiple access interfaces. Access interfaces or technologies include those associated with IEEE 802.11 networks, as well as those associated with wireless broadband networks, as for example single carrier radio transmission technology (1XRTT), general packet radio service (GPRS), "evolution, data only" (EVDO), high-speed data packet access (HSDPA), universal mobile telecommunications system (UMTS), and worldwide interoperability for microwave access (WiMAX).

Interfaces provided to enable mobile devices, as for example handheld devices, with the capability to maintain sessions associated with multiple access technologies generally are insufficient for applications which utilize relatively high bandwidth. In general, the available bandwidth on the interfaces is in the range between approximately one hundred and approximately three hundred kilobits per second (kbps), which is not sufficient to support applications that are relatively bandwidth intensive.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1:
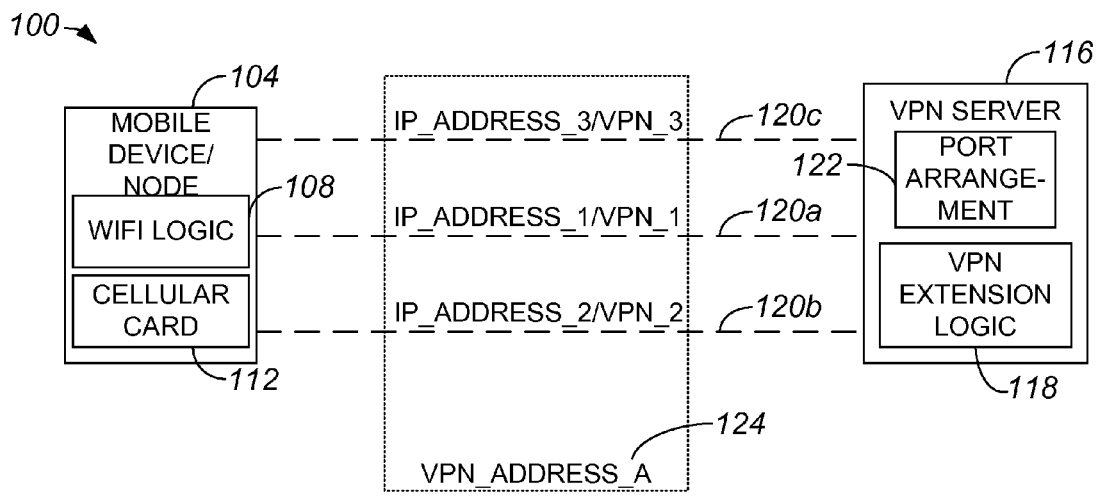
FIG. 1 is a block diagram representation of a system in which a single virtual private network (VPN) address is associated with multiple Internet protocol (IP) addresses in accordance with an embodiment of the present invention.

In one embodiment a method includes establishing a first tunnel between a node and a virtual private network (VPN) server. The first tunnel has a first address. The method also includes assigning a VPN address to the first tunnel, as well as establishing a second tunnel between the node and the VPN server. The second tunnel has a second address. The same VPN address, e.g., VPN server address, is assigned to the second tunnel, and VPN address is accessed by both the first address and the second address.

Multiple VPN tunnels are established to the same VPN concentrator using different interfaces such that the multiple VPN tunnels share the same VPN address and, thus, form a multi-path VPN. The multiple VPN tunnels are established over different interfaces by using the same user identifier to set up a relationship between the multiple tunnels using an IKE mode configuration.

Description

The ability to effectively create an aggregated data pipe that includes tunnels associated with various access interfaces enables traffic to be distributed on the tunnels to effectively optimize bandwidth, and allows the traffic sent on a particular tunnel to essentially be seamlessly transferred to different tunnels in the event that the particular tunnel fails. Hence, relatively high bandwidth applications may use multiple tunnels substantially simultaneously to accommodate bandwidth requirements, and a failure of one tunnel may be counteracted by a relatively transparent transition of traffic from the failed tunnel to a backup tunnel.

A virtual private network (VPN) owned by an organization, e.g., a company, is generally arranged to accommodate the needs of members of the organization who work remotely, e.g., at a remote site such as a home or a distant office. Typically, an organization has a private network, as for example a main local area network (LAN) located at a main office, to which members of the organization who work remotely desire access. A VPN substantially encompasses the private network and remote sites, and utilizes a public network such as the Internet to establish connections between the remote sites and the private network. By using virtual connections which are routed through a public network, remote sites associated with an organization may be connected to a main LAN of the organization.

In one embodiment, multiple VPN tunnels may be set up to the same VPN concentrator over different interfaces, using the same user identifier. As a result, a multi-path VPN may be created with respect to a user device, e.g., a mobile device. Within a VPN, a VPN concentrator creates multiple Internet Protocol (IP) security protocol suite (IPSec) security associations. The VPN concentrator includes scaleable encryption processing modules that allow the multiple IPSec security associations to be created. By leveraging multiple access interfaces associated with a mobile device, and signaling the VPN concentrator to create multiple IPSec security associations that are associated with the same network access identifier (NAI), the same VPN address may be applied to tunnels of the multiple access interfaces. In other words, the same VPN address may refer to a plurality of tunnels that are associated with different access interfaces. As a result, a relatively high bandwidth application may use multiple tunnels to transmit and receive data. Further, if a tunnel associated with a particular access interface becomes unusable, traffic may effectively be seamless transferred to a tunnel associated with a different access interface.

Referring initially to FIG. 1, a system in which a single VPN address is associated with multiple links will be described. FIG. 1 is a block diagram representation of a system in which a single virtual private network (VPN) address is associated with multiple Internet IP addresses in accordance with an embodiment of the present invention. A system 100 includes a VPN server 116 that is arranged to effectively serve as a gateway within system 100 that allows clients to connect to a network. VPN server 116 may be implemented as hardware and/or software.

As shown, a mobile device or node 104 is effectively a client that utilizes VPN server 116 as a gateway. In one embodiment, mobile device 104 may be a cellular phone. It should be appreciated, however, that mobile device 104 may be any suitable network element, e.g., a network element with routing functionality. Mobile device 104, which has a fixed home address, is arranged to have more than one interface that allows mobile device 104 to access a network (not shown). The interfaces may be widely varied, and may include a Wi-Fi interface 108 and a cellular interface 112. Typically, mobile device 104 may have any number of interfaces through which mobile device 104 may access VPN server 116.

VPN server 116 includes a port arrangement 122 which supports links such as VPN links 120a-c between VPN server 116 and mobile device 104. VPN server 116 also includes VPN extension logic 118 that is arranged to assign a single VPN address, as for example VPN_ADDRESS_A 124, to multiple VPN links 120a-c.

In general, each interface associated with mobile device 104 may connect to VPN server 116 via a dedicated link 120a-c. As shown, Wi-Fi interface 108 has a link 120a that is associated with IP_ADDRESS_1, while cellular interface 112 has a link 120b that is associated with IP_ADDRESS_2. VPN_ADDRESS_A 124 may be accessed by any of links 120a-c. While the format of VPN_ADDRESS_A 124 may vary widely, VPN_ADDRESS_A 124 is typically a twelve byte string that includes a route distinguisher and an IP address. By way of example, VPN_ADDRESS_A 124 may include a route distinguisher and IP_ADDRESS_1 if link 120a is established before links 120b, 120c.

Figure 2:
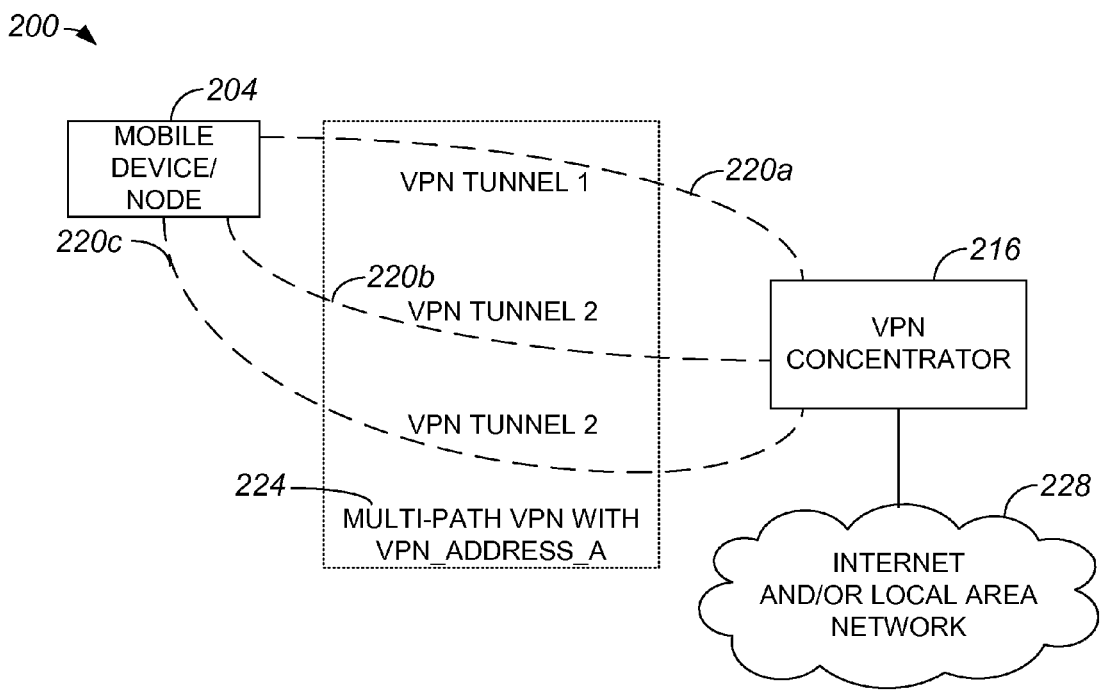
FIG. 2 is a block diagram representation of a system in which a single VPN address is associated with multiple VPN tunnels in accordance with an embodiment of the present invention.

As previously mentioned, a VPN server may effectively serve as a gateway to a network, e.g., a LAN and/or the Internet. That is, a VPN server may act as a gateway with respect to allowing a mobile device to communicate with a network using tunnels that share a VPN address. FIG. 2 is a block diagram representation of a system in which a single VPN address is associated with multiple VPN tunnels to a VPN concentrator that is in communication with a network in accordance with an embodiment of the present invention. A system 200 includes a VPN concentrator 216 and a mobile device 204. Multiple VPN tunnels 220a-c or, more generally, links are established to enable information to be exchanged between mobile device 204 and VPN concentrator 216. Through VPN concentrator 216, mobile device 204 may gain access to the Internet and/or a local area network 228. VPN tunnels 220a-c are effectively a multi-path VPN, and share a VPN address 224. As shown, VPN tunnels 220a-c are each associated with VPN_ADDRESS_A 224.

Figure 3:
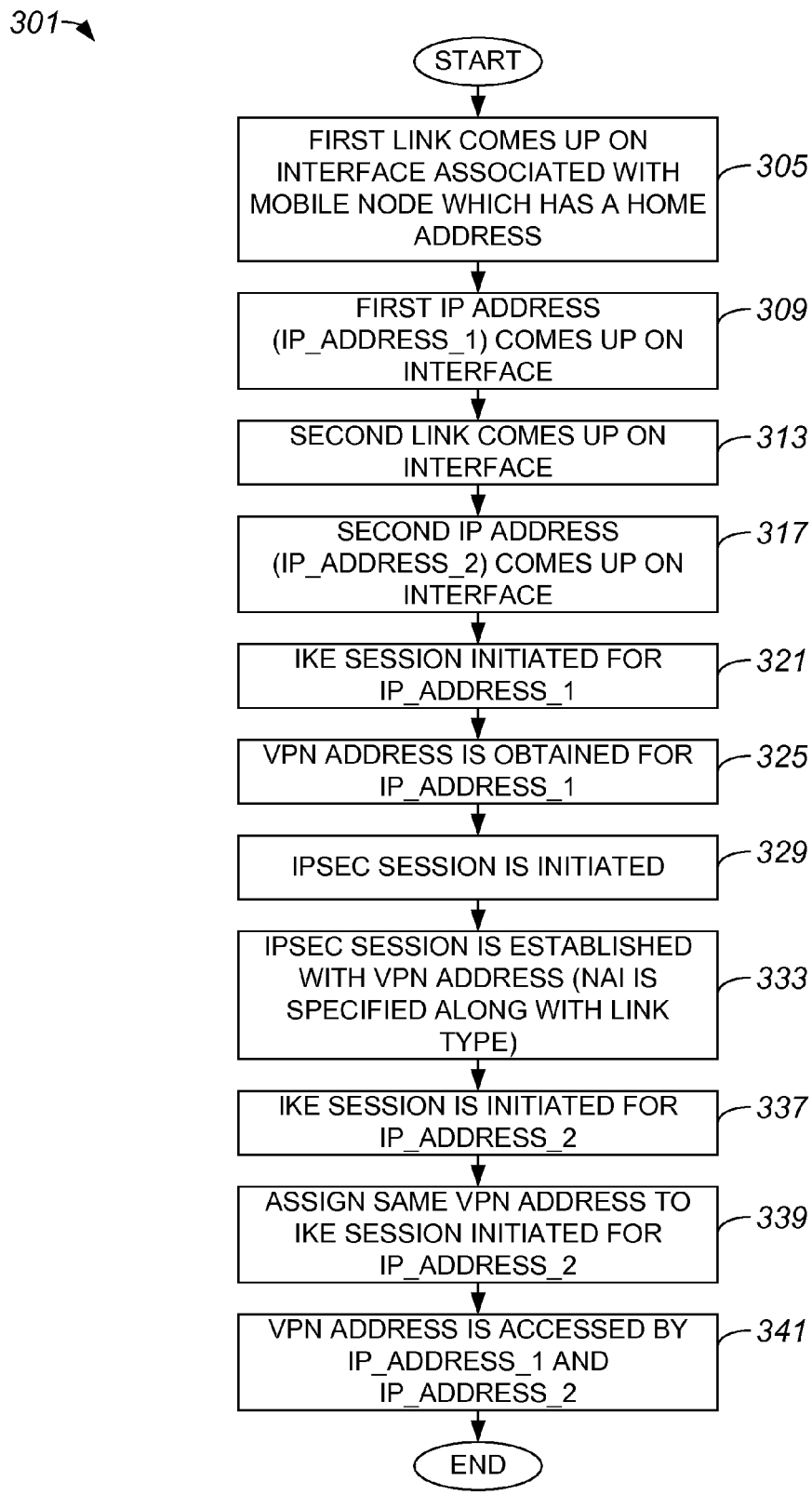
FIG. 3 is a process flow diagram which illustrates one method of associating a single VPN address with a plurality of IP addresses in accordance with an embodiment of the present invention.

FIG. 3 is a process flow diagram which illustrates one method of associating a single VPN address with a plurality of tunnels as a part of a multi-path VPN in accordance with an embodiment of the present invention. Associating a single VPN address with a plurality of tunnels or a plurality of IP addresses is generally accomplished using a VPN server or a VPN concentrator. A process 301 of associating a single VPN address with a plurality of IP addresses begins at step 305 in which a first link comes up on a first interface associated with a mobile node which has a home address. The first link may be a first tunnel associated with a first access interface, and may appear on the interface as being associated with a dynamic host configuration protocol (DHCP) or an IP control protocol (IPCP) that is arranged to enable an IP address associated with the first link to be obtained. In one embodiment, the first link may be a Wi-Fi interface or a cellular link. It should be appreciated, however, that the first link may be any suitable link that is supported by the mobile node.

After the first link comes up on the first interface, a first IP address IP_ADDRESS_1 comes up on the first interface in step 309. IP_ADDRESS_1 is associated with the first link, and may be a first care_of_address associated with the DHCP. In step 313, a second link comes up on the interface. Typically, the second link is different from the first link. For example, if the first link is a Wi-Fi link, the second link may be a cellular link. However, it should be understood that the first link and the second link are not necessarily of different types.

Once the second link comes up on the interface in step 313, a second IP address IP_ADDRESS_2 comes up on the interface in step 317. Then, in step 321, an Internet key exchange (IKE) session is initiated with respect to IP_ADDRESS_1. Initiating an IKE session may include specifying a NAI and a link type. Specifying the link type allows the link to be associated with sending a particular type of data. By way of example, if the link is particularly suitable for sending video data, knowledge of the link type allows the link to be specified as being used to send only video data. A link identifier may be used to specify the type of link to be used for the IKE session.

The IKE session allows IPSec security associations to effectively be negotiated. That is, the IKE session allows a relationship between two or more entities to be formed that describes how the entities will engage in secure communications. In general, the IKE session creates an IKE security association with respect to the mobile node and a VPN, and then negotiates IPSec security associations. The initiation of the IKE session effectively signals, e.g., to a VPN concentrator, that a VPN is to be established.

During the IKE session established for IP_ADDRESS_1, a VPN address is obtained in step 325. The VPN address that is obtained is associated with IP_ADDRESS_1. When IP_ADDRESS_1 is associated with the VPN address, the first link effectively becomes a VPN tunnel. After the VPN address is obtained, an IPSec session is initiated in step 329. The VPN address may be used for communication by a client. In general, an IPSec session is arranged to protect data flows between IPSec peers by providing data authentication through encryption.

The IPSec session is established in step 333 with the VPN address that was obtained in step 325. Establishing the IPSec session also entails specifying an NAI and a link type associated with the first link. The IPSec session may create multiple security associations, e.g., one for each link. After the IPSec session is established, an IKE session is initiated for IP_ADDRESS_2 in step 337. In step 339, the VPN address obtained in step 325 is assigned to the IKE session initiated for IP_ADDRESS_2. Assigning or otherwise specifying the VPN address allows IP_ADDRESS_2 to be associated with the same VPN address that is associated with IP_ADDRESS_1.

Although the VPN address may be assigned in step 339, it should be understood that the VPN address may not necessarily be explicitly specified. Instead, the VPN address may be implicitly specified in that a VPN server or VPN concentrator may identify the NAI, and ascertain that IP_ADDRESS_2 is to be added to the multi-path VPN associated with the VPN address.

Once the IKE session is initiated for IP_ADDRESS_2 and the VPN address is assigned, the VPN address may be accessed in step 341 by both $IP\_ADDRESS\_1$ and IP_ADDRESS_2. Upon the VPN address being accessible by both IP_ADDRESS_1 and IP_ADDRESS_2, the process of associating a single VPN address with a plurality of IP addresses is completed.

Methods associated with using a multi-path VPN may vary widely. As discussed above, some applications may distribute bandwidth across multiple paths or tunnels of a multi-path VPN. That is, a multi-path VPN with a shared VPN address may be used such that a traffic load may be shared among different paths. Additionally, a multi-path VPN with a shared VPN address may be used such that any given path in the multi-path VPN effectively has at least one backup path within the multi-path VPN to which traffic may be rerouted substantially transparently. The backup path may be used in the event that an original path fails, or otherwise becomes unusable, e.g., a mobile device has moved out of the range which may be supported by the original path.

Figure 4:
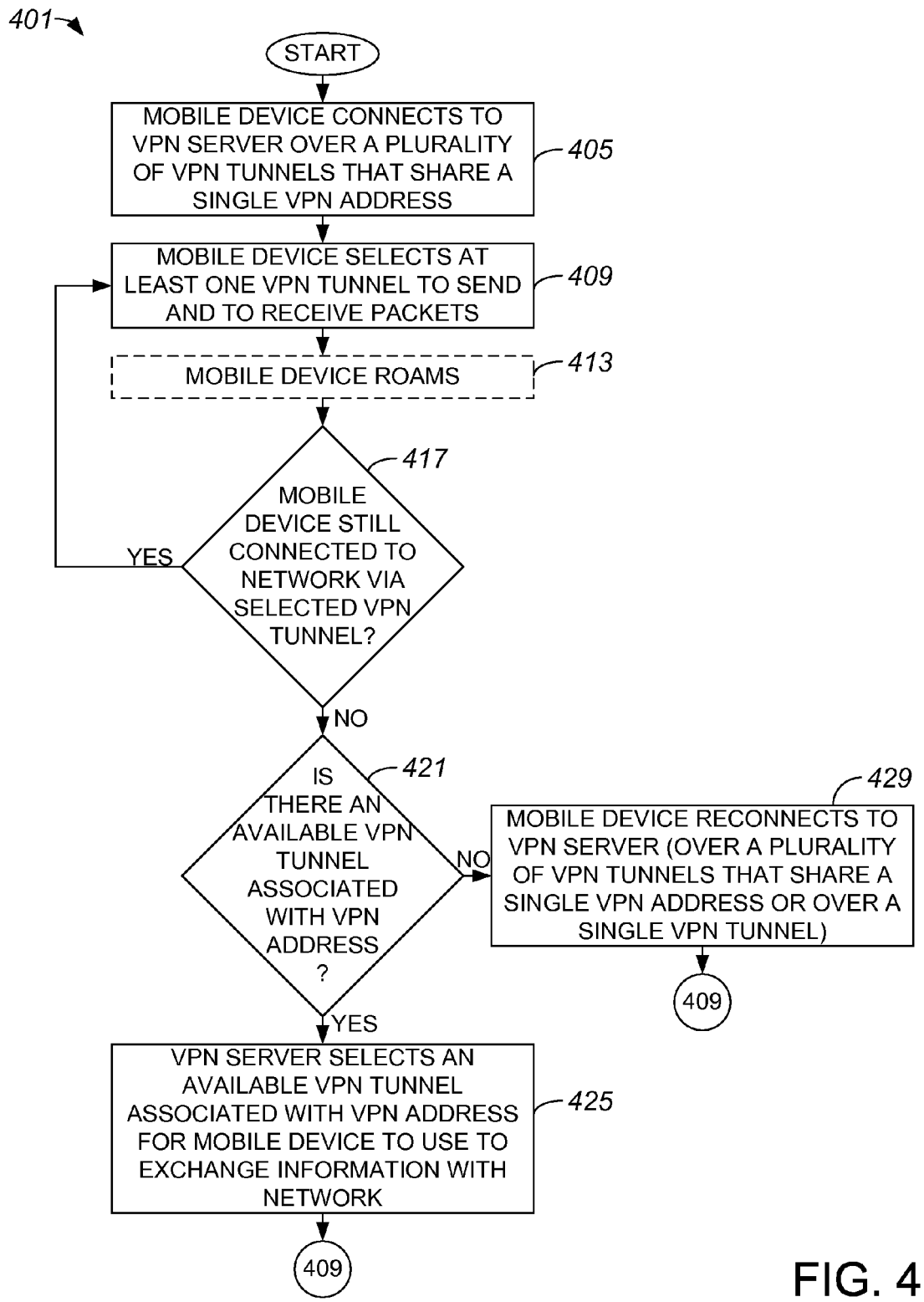
FIG. 4 is a process flow diagram which illustrates a method of utilizing a multi-path VPN in accordance with an embodiment of the present invention.

FIG. 4 is a process flow diagram which illustrates a method of utilizing a multi-path VPN between a mobile device and a VPN server in accordance with an embodiment of the present invention. A process 401 of using a multi-path VPN begins at step 405 in which a mobile device connects to a VPN server over a plurality of VPN tunnels that share a single VPN address. Upon connecting to the VPN server, the mobile device uses at least one VPN tunnel in step 409 to send and receive packets, or to otherwise exchange information with a network, i.e., a private network or the Internet. It should be appreciated that any of the plurality of VPN tunnels may be used to send and to receive packets. In the described embodiment, a single VPN tunnel may be selected for use in exchanging information. However, it should be appreciated that a plurality of VPN tunnels may be selected for use in exchanging information such that information may be transmitted and received on more than one VPN tunnel. That is, a plurality of VPN tunnels may be used substantially simultaneously to exchange information in an aggregated manner.

The selection of an appropriate VPN tunnel to use in exchanging information may include, but is not limited to including, load-balancing considerations, traffic-type considerations, and cost considerations. By way of example, a VPN tunnel that is relatively unused may be selected due to load-balancing considerations, or a VPN tunnel that is substantially dedicated to transmitting voice traffic may be selected to exchange voice information.

After the mobile device uses a selected VPN tunnel to exchange information with a network, the mobile device may optionally roams in step 413. It should be appreciated that during roaming, the mobile device may lose the connection to the VPN server associated with the selected VPN tunnel. As such, the mobile device may no longer be connected to the network via the selected VPN tunnel.

A determination is made in step 417 as to whether the mobile device is still connected to the network via the selected VPN tunnel. In one embodiment, such a determination may be made periodically at predetermined times, or may be made when the mobile device identifies a factor that may indicate a lost connection. If the determination in step 417 is that the mobile device is still connected to the network via the selected VPN tunnel, then process flow returns to step 409 in which the mobile device continues to use at least one VPN tunnel to send and to receive packets.

Alternatively, if it is determined in step 417 that the mobile device is not still connected to the network via the selected VPN tunnel, then process flow moves to step 421 in which it is determined whether there is an available VPN tunnel that is associated with the VPN address. Such a determination may include, but is not limited to including, determining if there are any VPN tunnels that are physically functional and/or determining if there are any VPN tunnels that have available bandwidth.

If it is determined in step 421 that there are no available VPN tunnels associated with the VPN address, then the mobile device reconnects to the VPN server in step 429. In one embodiment, reconnecting to the VPN server includes establishing a plurality of VPN tunnels that share a single VPN address. It should be appreciated, however, the reconnecting to the VPN server may instead include establishing a single VPN tunnel to the VPN server. Once the mobile device reconnects to the VPN server, process flow returns to step 409 in which the mobile device uses a selected VPN tunnel to exchange information with the network.

Returning to step 421, if it is determined that there is an available VPN tunnel associated with the VPN address, then the indication is that information may continue to be exchanged between the mobile device and the network over a backup tunnel. Accordingly, in step 425, the VPN server selects an available VPN tunnel associated with the VPN address that the mobile device may use to exchange information with the network. As previously mentioned, a variety of different considerations may be factored into the selection of a backup VPN tunnel. After the backup VPN tunnel is selected, process flow returns to step 409 in which the mobile device uses a selected VPN tunnel to exchange information with the network.

With respect to an IPSec transport layer and an overlay layer, the mapping of one VPN address to multiple IP addresses is such that from the point-of-view of the transport layer, there is effectively a single link between a mobile device and a VPN server or concentrator. The IPSec transport layer is typically the session opened between the IP address of a client and a VPN server. The overlay layer is typically the session between the VPN address of the client and the IP address of a communication peer.

Figure 5:
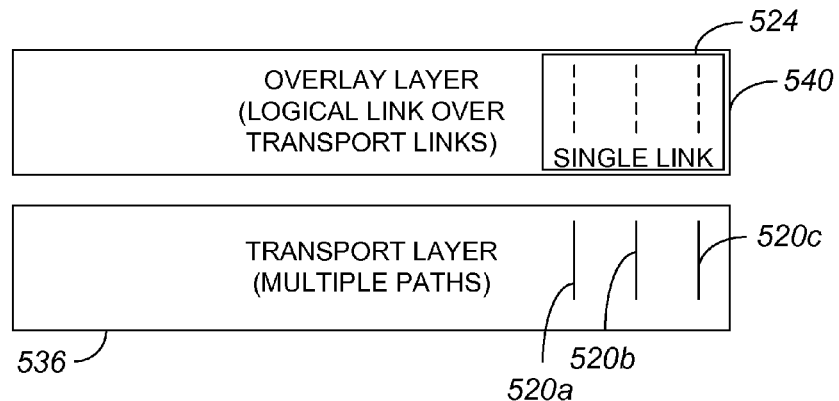
FIG. 5 is a block diagram representation of a plurality of links in a transport layer that are effectively associated with a single link in an overlay layer in accordance with an embodiment of the present invention.

From the point-of-view of the overlay layer, there are multiple links between the mobile device and the VPN server or concentrator. FIG. 5 is a block diagram representation of a plurality of links in a transport layer that are effectively associated with a single link in an overlay layer in accordance with an embodiment of the present invention. In a transport layer 536, there are multiple links or tunnels 520a-c established between a mobile node (not shown) and a VPN server or concentrator (not shown). Each link 520a-c is arranged to exchange information between the mobile node and the VPN server (not shown), which has a VPN address.

As will be appreciated by those skilled in the art, an overlay layer 540 overlies the transport layer. With respect to overlay layer 540, which is associated with a VPN address, links 520a-c, which are associated with separate IP addresses, appear as a substantially single link 524. Hence, overlay layer 540 is unaware of which link 520a-c is actually being used to exchange information, and is aware only that information is being exchanged using one or more of links 520a-c. In other words, overlay layer is aware only that some number of links 520a-c identified a single link 524 is in use, but is unaware of which actual link or links 520a-c is in use.

Figure 6:
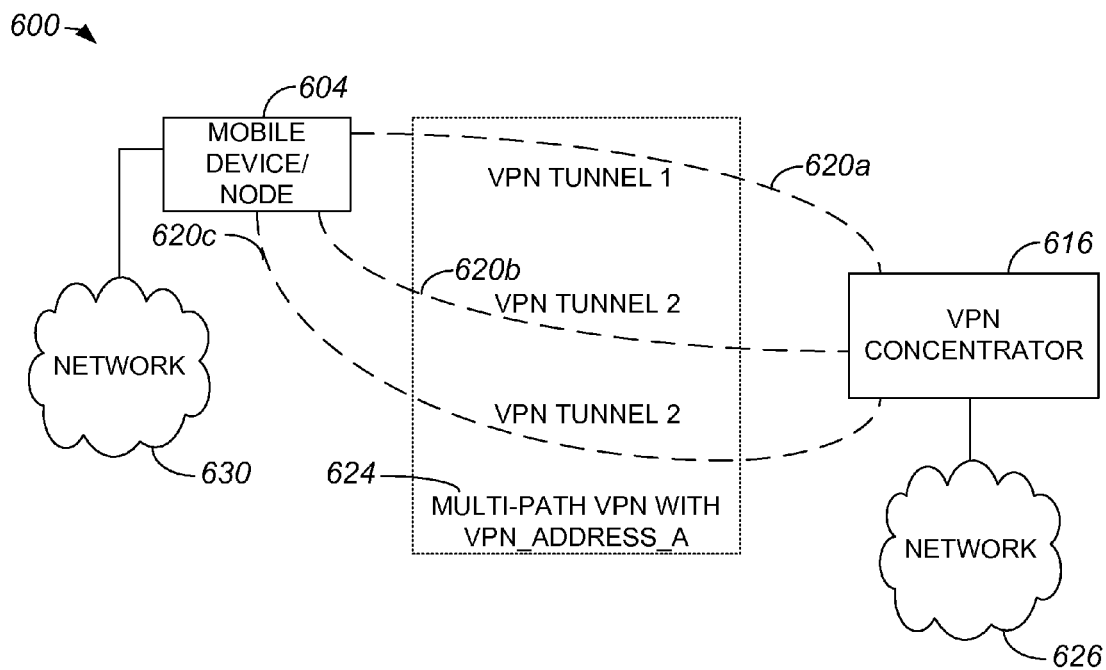
FIG. 6 is a block diagram representation of a system in which a network may move relative to a VPN concentrator that supports a single VPN address for multiple VPN tunnels in accordance with an embodiment of the present invention.

A mobile node which exchanges information with a VPN server or concentrator through a multi-path VPN may be substantially connected to a network, i.e., a mobile network, such that the mobile network may move with the mobile node. Referring next to FIG. 6, a system in which a network may move relative to a VPN concentrator that supports a single VPN address for multiple VPN tunnels will be described in accordance with an embodiment of the present invention. A system 600 includes a mobile device 604 and a VPN concentrator 616. A multi-path VPN with a VPN address of VPN_ADDRESS_A 624 is established between mobile device 604 and VPN concentrator 616, and includes a plurality of VPN tunnels 620*a-c*.

Mobile device 604, which may include routing functionality, is in communication with a network 630. In one embodiment, network 630 is a mobile network that may move with mobile device 604. When mobile device 604 is effectively a mobile router, mobile device 604 may register at least one mobile network prefix, associated with network 630. The mobile network prefix is a substantially complete IP subnet on mobile device 604. It should be appreciated that there may be a network (not shown) effectively behind mobile device 604, and packets may be sent using addresses associated with the substantially complete IP subnet. Mobile device 604 registers the mobile network prefixes with VPN concentrator 616, as for example using IKE messaging, which acts as a topological anchor point for the mobile network prefix. VPN concentrator 616 injects the registered network prefixes into a routing infrastructure in order to establish itself as the topological anchor point for the mobile network prefixes.

VPN concentrator 616 allows mobile device 604 and, hence, network 630, to access a network 626 which may include a LAN and/or the Internet. If a tunnel 620*a-c* on which information is being exchanged fails, traffic may be rerouted to another tunnel 620*a-c* substantially transparently, as tunnels 620*a-c* are each associated with VPN_ADDRESS_A 624. As such, nodes (not shown) within network 630 may continue to access network 626 substantially without interruption even if one or more tunnels 620*a-c* fails or is otherwise inaccessible.

As mobile device 604 moves, the care_of address of one or more interfaces associated with tunnels 620*a-c* may change. When the care_of address of one or more interfaces changes, mobile device 604 may detect such a change, and send a message, e.g., a MOBIKE message, which indicates that a security association for the one or more interfaces is to be updated without tearing down an existing IKE session. Such a message is sent to VPN concentrator 616. It should be understood that a MOBIKE message generally allows hosts to update IP addresses associated with an IKE session, and allows a tunnels to be maintained while mobile device 604 moves.

Although only a few embodiments of the present invention have been described, it should be understood that the present invention may be embodied in many other specific forms without departing from the spirit or the scope of the present invention. By way of example, although two IP addresses have been described as being associated with a single VPN address, any number of IP addresses may be associated with a single VPN address. That is, more than two IP address may be associated with one VPN address.

A mobile node or device may be substantially any element that support communications via a VPN. Suitable mobile nodes may include, but are not limited to including, cellular phones, computers, routers, tablets, sensors, and personal digital assistants (PDAs).

A single VPN tunnel that is a part of a multi-path VPN may have one or more associated backup VPN tunnels. In a system in which information is transmitted over a plurality of VPN tunnels in a multi-path VPN, the plurality of VPN tunnels may also have one or more associated backup VPN tunnels. That is, in a multi-path VPN which aggregates a plurality of VPN tunnels for use in exchanging information, not all of the VPN tunnels are necessarily aggregated into the plurality of VPN tunnels. For example, if a pair of VPN tunnels may no longer be used to exchange information, the information may be provided to another pair of VPN tunnels for exchange.

While a VPN address has generally been described as including an IP address, e.g., the IP address associated with the first interface for which a tunnel is established, a VPN address may include substantially any suitable address that identifies a multi-path VPN. Further, when a VPN address includes an IP address, the included IP address is not limited to being the IP address associated with the first interface for which a tunnel is established.

In one embodiment, a mobile device such as device 204 of FIG. 2 may include logic that enables the mobile device to request the same VPN address across multiple VPN tunnels. When the mobile device requests the same VPN address across multiple VPN tunnels, the mobile device may include its unique identifier in a request to the VPN server, e.g., a request to associated multiple VPN tunnels with a single VON address. A mobile device may also have the ability to request a prefix or IP subnet over multiple VPNs.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
    establishing a first tunnel between a node and a virtual private network (VPN) server, wherein the first tunnel has a first address;
    assigning a VPN address to the first tunnel;
    establishing a second tunnel between the node and the VPN server, wherein the second tunnel has a second address; and
    assigning the VPN address to the second tunnel, wherein the VPN address is arranged to be accessed by the first address and the second address.

2. The method of claim 1 further including:
    utilizing the first tunnel and the second tunnel to transmit and to receive data substantially simultaneously in an aggregated manner.

3. The method of claim 1 wherein the first address is a first Internet Protocol (IP) address and the second address is a second IP address.

4. The method of claim 1 wherein the node is a mobile node.

5. The method of claim 4 wherein the mobile node is in communication with a mobile network, and the VPN server is in communication with a local area network.

6. The method of claim 1 wherein the first tunnel is associated with a Wi-Fi interface, and the second tunnel is associated with a cellular interface.

7. The method of claim 1 wherein establishing the first tunnel includes initiating a first Internet key exchange (IKE) session for the first address and establishing the second tunnel includes initiating a second IKE session for the second address, initiating the second IKE session including specifying the VPN address.

8. The method of claim 7 further including establishing an Internet Protocol security protocol suite (IPSec) session with the VPN address.

9. The method of claim 1 wherein traffic is arranged to be exchanged between the node and the VPN server using the second tunnel if the first tunnel is unavailable.

10. Logic encoded in one or more non-transitory computer-readable media for execution and when executed, operable to:
establish a first tunnel between a node and a virtual private network (VPN) server, wherein the first tunnel has a first address;
assign a VPN address to the first tunnel;
establish a second tunnel between the node and the VPN server, wherein the second tunnel has a second address; and
assign the VPN address to the second tunnel, wherein the VPN address is arranged to be accessed by the first address and the second address.

11. The logic of claim 10 wherein the first address is a first Internet Protocol (IP) address and the second address is a second IP address.

12. The logic of claim 10 wherein the node is a mobile node.

13. The logic of claim 12 wherein the mobile node is in communication with a mobile network, and the VPN server is in communication with a local area network.

14. The logic of claim 10 wherein the first tunnel is associated with a Wi-Fi interface, and the second tunnel is associated with a cellular interface.

15. The logic of claim 10 wherein the logic operable to establish the first tunnel is further operable to initiate a first Internet key exchange (IKE) session for the first address and to establish the second tunnel includes initiating a second IKE session for the second address, the logic operable to initiate the second IKE session further being operable to specify the VPN address.

16. The logic of claim 15 further including logic operable to establish an Internet Protocol security protocol suite (IPSec) session with the VPN address.

17. An apparatus comprising:
means for establishing a first tunnel to a node, wherein the first tunnel has a first address;
means for assigning a virtual private network (VPN) address to the first tunnel;
means for establishing a second tunnel to the node, wherein the second tunnel has a second address; and
means for assigning the VPN address to the second tunnel, wherein the VPN address is arranged to be accessed by the first address and the second address.

18. The apparatus of claim 17 wherein the first address is a first Internet Protocol (IP) address and the second address is a second IP address.

19. The apparatus of claim 17 wherein the node is a mobile node.

20. The apparatus of claim 19 wherein the mobile node is in communication with a mobile network, and the apparatus further includes means for communicating with a local area network.

21. The apparatus of claim 17 wherein the first tunnel is associated with a Wi-Fi interface, and the second tunnel is associated with a cellular interface.

22. The apparatus of claim 17 wherein the means for establishing the first tunnel include means for initiating a first Internet key exchange (IKE) session for the first address and the means for establishing the second tunnel include means for initiating a second IKE session for the second address, the means for initiating the second IKE session including means for specifying the VPN address.

23. The apparatus of claim 22 further including means for establishing an Internet Protocol security protocol suite (IPSec) session with the VPN address.

24. An apparatus comprising:
a port arrangement;
logic, embodied on a non-transitory medium, for establishing a plurality of tunnels between the port arrangement and a node; and
logic, embodied on a non-transitory medium, for assigning a common virtual private network (VPN) address to the plurality of tunnels.

25. The apparatus of claim 24 wherein the logic for establishing the plurality of tunnels includes logic for establishing a first tunnel and logic for establishing a second tunnel, the first tunnel having a first address and the second tunnel having a second address.

26. The apparatus of claim 25 wherein the logic for assigning the common VPN address to the plurality of tunnels includes logic for obtaining the common VPN address for the first tunnel and logic for assigning the common VPN address to the second tunnel, wherein the common VPN address is arranged to be accessed by the first address and the second address.

* * * * *